(12) United States Patent
Intrater et al.

(10) Patent No.: US 9,276,619 B1
(45) Date of Patent: Mar. 1, 2016

(54) DYNAMIC CONFIGURATION OF MODULATION AND DEMODULATION

(71) Applicant: MagnaCom Ltd., Petach Tikva (IL)

(72) Inventors: Amos Intrater, Even Yehuda (IL); Amir Eliaz, Moshav Ben Shemen (IL); Shlomy Chaikin, Mazor (IL); Gal Pitarasho, Tel Aviv (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 14/563,046

(22) Filed: Dec. 8, 2014

(51) Int. Cl.
*H04K 1/02* (2006.01)
*H04B 1/10* (2006.01)
*H04B 1/04* (2006.01)

(52) U.S. Cl.
CPC ............ *H04B 1/1027* (2013.01); *H04B 1/0475* (2013.01)

(58) Field of Classification Search
CPC ............ H04J 11/0073; H04L 27/2613; H04L 27/266; H04L 27/2663; H04L 27/2656; H04L 27/368; H04W 48/16; H03F 1/3247
USPC .................................................. 375/296, 297
See application file for complete search history.

(56) References Cited

U.S. PATENT DOCUMENTS

| | | | |
|---|---|---|---|
| 4,109,101 A | 8/1978 | Mitani | |
| 4,135,057 A | 1/1979 | Bayless, Sr. et al. | |
| 4,797,925 A | 1/1989 | Lin | |
| 5,111,484 A | 5/1992 | Karabinis | |
| 5,131,011 A | 7/1992 | Bergmans et al. | |
| 5,202,903 A | 4/1993 | Okanoue | |
| 5,249,200 A | 9/1993 | Chen et al. | |
| 5,283,813 A | 2/1994 | Shalvi et al. | |
| 5,291,516 A | 3/1994 | Dixon et al. | |
| 5,394,439 A | 2/1995 | Hemmati | |
| 5,432,822 A | 7/1995 | Kaewell, Jr. | |
| 5,459,762 A * | 10/1995 | Wang et al. | 375/336 |

(Continued)

FOREIGN PATENT DOCUMENTS

WO  2013030815 A1  3/2013

OTHER PUBLICATIONS

Equalization: The Correction and Analysis of Degraded Signals, White Paper, Agilent Technologies, Ransom Stephens V1.0, Aug. 15, 2005 (12 pages).

(Continued)

*Primary Examiner* — Helene Tayong
(74) *Attorney, Agent, or Firm* — McAndrews, Held & Malloy, Ltd.

(57) ABSTRACT

A modulator and demodulator pair may switch configurations without introducing errors as a result of the switch. Different configurations may, for example, correspond to different symbol rates and/or different amounts of controlled inter-symbol interference (ISI) introduced to the transmitted signal. For example, a first configuration may use be a near-zero ISI configuration (e.g., using Nyquist signaling) and a second configuration may introduce a significant (e.g., amount that would result in errors above a desired threshold if demodulation relied on symbol-by-symbol slicing) but controlled amount of ISI (e.g., using partial response or faster-than-Nyquist-rate signaling). Switching between modulator/demodulator configurations may be needed to maintain a stable link in the case of dynamic channels. At any given time, a modulator and demodulator pair may, for example, switch to a configuration that provides maximal throughput for the current channel conditions.

28 Claims, 3 Drawing Sheets

(56) References Cited

U.S. PATENT DOCUMENTS

| | | |
|---|---|---|
| 5,590,121 A | 12/1996 | Geigel et al. |
| 5,602,507 A | 2/1997 | Suzuki |
| 5,757,855 A | 5/1998 | Strolle et al. |
| 5,784,415 A | 7/1998 | Chevillat et al. |
| 5,818,653 A | 10/1998 | Park et al. |
| 5,886,748 A | 3/1999 | Lee |
| 5,889,823 A | 3/1999 | Agazzi et al. |
| 5,915,213 A | 6/1999 | Iwatsuki et al. |
| 5,930,309 A | 7/1999 | Knutson et al. |
| 6,009,120 A | 12/1999 | Nobakht |
| 6,167,079 A | 12/2000 | Kinnunen et al. |
| 6,233,709 B1 | 5/2001 | Zhang et al. |
| 6,272,173 B1 | 8/2001 | Hatamian |
| 6,335,954 B1 | 1/2002 | Bottomley et al. |
| 6,356,586 B1 | 3/2002 | Krishnamoorthy et al. |
| 6,516,437 B1 | 2/2003 | Van Stralen et al. |
| 6,532,256 B2 | 3/2003 | Miller |
| 6,535,549 B1 | 3/2003 | Scott et al. |
| 6,690,754 B1 | 2/2004 | Haratsch et al. |
| 6,697,441 B1 | 2/2004 | Bottomley et al. |
| 6,785,342 B1 | 8/2004 | Isaksen et al. |
| 6,871,208 B2 | 3/2005 | Guo et al. |
| 6,968,021 B1 | 11/2005 | White et al. |
| 6,985,709 B2 | 1/2006 | Perets |
| 7,158,324 B2 | 1/2007 | Stein et al. |
| 7,190,288 B2 | 3/2007 | Robinson et al. |
| 7,190,721 B2 | 3/2007 | Garrett |
| 7,205,798 B1 | 4/2007 | Agarwal et al. |
| 7,206,363 B2 | 4/2007 | Hegde et al. |
| 7,215,716 B1 | 5/2007 | Smith |
| 7,269,205 B2 | 9/2007 | Wang |
| 7,467,338 B2 | 12/2008 | Saul |
| 7,830,854 B1 | 11/2010 | Sarkar et al. |
| 7,974,230 B1 | 7/2011 | Talley et al. |
| 8,005,170 B2 | 8/2011 | Lee et al. |
| 8,059,737 B2 | 11/2011 | Yang |
| 8,175,186 B1 | 5/2012 | Wiss et al. |
| 8,199,804 B1 | 6/2012 | Cheong |
| 8,248,975 B2 | 8/2012 | Fujita et al. |
| 8,351,536 B2 | 1/2013 | Mazet et al. |
| 8,422,589 B2 | 4/2013 | Golitschek Edler Von Elbwart et al. |
| 8,526,523 B1 | 9/2013 | Eliaz |
| 8,548,072 B1 | 10/2013 | Eliaz |
| 8,548,089 B2 | 10/2013 | Agazzi et al. |
| 8,548,097 B1 | 10/2013 | Eliaz |
| 8,553,821 B1 | 10/2013 | Eliaz |
| 8,559,494 B1 | 10/2013 | Eliaz |
| 8,559,496 B1 | 10/2013 | Eliaz |
| 8,559,498 B1 | 10/2013 | Eliaz |
| 8,565,363 B1 | 10/2013 | Eliaz |
| 8,566,687 B1 | 10/2013 | Eliaz |
| 8,571,131 B1 | 10/2013 | Eliaz |
| 8,571,146 B1 | 10/2013 | Eliaz |
| 8,572,458 B1 | 10/2013 | Eliaz |
| 8,582,637 B1 | 11/2013 | Eliaz |
| 8,599,914 B1 | 12/2013 | Eliaz |
| 8,605,832 B1 | 12/2013 | Eliaz |
| 8,665,941 B1 | 3/2014 | Eliaz |
| 8,665,992 B1 | 3/2014 | Eliaz |
| 8,666,000 B2 | 3/2014 | Eliaz |
| 8,675,769 B1 | 3/2014 | Eliaz |
| 8,675,782 B2 | 3/2014 | Eliaz |
| 8,681,889 B2 | 3/2014 | Eliaz |
| 8,737,458 B2 | 5/2014 | Eliaz |
| 8,744,003 B2 | 6/2014 | Eliaz |
| 8,781,008 B2 | 7/2014 | Eliaz |
| 8,804,879 B1 | 8/2014 | Eliaz |
| 8,811,548 B2 | 8/2014 | Eliaz |
| 8,824,572 B2 | 9/2014 | Eliaz |
| 8,824,599 B1 | 9/2014 | Eliaz |
| 8,824,611 B2 | 9/2014 | Eliaz |
| 8,831,124 B2 | 9/2014 | Eliaz |
| 8,842,778 B2 | 9/2014 | Eliaz |
| 8,873,612 B1 | 10/2014 | Eliaz |
| 8,885,698 B2 | 11/2014 | Eliaz |
| 8,885,786 B2 | 11/2014 | Eliaz |
| 8,891,701 B1 | 11/2014 | Eliaz |
| 8,897,387 B1 | 11/2014 | Eliaz |
| 8,897,405 B2 | 11/2014 | Eliaz |
| 8,948,321 B2 | 2/2015 | Eliaz |
| 2001/0008542 A1 | 7/2001 | Wiebke et al. |
| 2002/0016938 A1 | 2/2002 | Starr |
| 2002/0123318 A1 | 9/2002 | Lagarrigue |
| 2002/0150065 A1 | 10/2002 | Ponnekanti |
| 2002/0150184 A1 | 10/2002 | Hafeez et al. |
| 2002/0172297 A1 | 11/2002 | Ouchi et al. |
| 2003/0016741 A1 | 1/2003 | Sasson et al. |
| 2003/0135809 A1 | 7/2003 | Kim |
| 2003/0210352 A1 | 11/2003 | Fitzsimmons et al. |
| 2004/0037374 A1 | 2/2004 | Gonikberg |
| 2004/0086276 A1 | 5/2004 | Lenosky |
| 2004/0120409 A1 | 6/2004 | Yasotharan et al. |
| 2004/0142666 A1 | 7/2004 | Creigh et al. |
| 2004/0170228 A1 | 9/2004 | Vadde |
| 2004/0174937 A1 | 9/2004 | Ungerboeck |
| 2004/0203458 A1 | 10/2004 | Nigra |
| 2004/0227570 A1 | 11/2004 | Jackson et al. |
| 2004/0240578 A1 | 12/2004 | Thesling |
| 2004/0257955 A1 | 12/2004 | Yamanaka |
| 2004/0264608 A1* | 12/2004 | Habuka et al. ............... 375/345 |
| 2005/0032472 A1 | 2/2005 | Jiang et al. |
| 2005/0047517 A1 | 3/2005 | Georgios et al. |
| 2005/0123077 A1 | 6/2005 | Kim |
| 2005/0135472 A1 | 6/2005 | Higashino |
| 2005/0163252 A1 | 7/2005 | McCallister et al. |
| 2005/0193318 A1 | 9/2005 | Okumura et al. |
| 2005/0220218 A1* | 10/2005 | Jensen et al. ................ 375/302 |
| 2005/0265470 A1 | 12/2005 | Kishigami et al. |
| 2005/0276317 A1* | 12/2005 | Jeong et al. ................. 375/213 |
| 2006/0067396 A1 | 3/2006 | Christensen |
| 2006/0109780 A1 | 5/2006 | Fechtel |
| 2006/0171489 A1 | 8/2006 | Ghosh et al. |
| 2006/0203943 A1 | 9/2006 | Scheim et al. |
| 2006/0239339 A1 | 10/2006 | Brown et al. |
| 2006/0245765 A1 | 11/2006 | Elahmadi et al. |
| 2006/0280113 A1 | 12/2006 | Huo |
| 2007/0092017 A1 | 4/2007 | Abedi |
| 2007/0098059 A1 | 5/2007 | Ives et al. |
| 2007/0098090 A1 | 5/2007 | Ma et al. |
| 2007/0098116 A1 | 5/2007 | Kim et al. |
| 2007/0110177 A1 | 5/2007 | Molander et al. |
| 2007/0110191 A1 | 5/2007 | Kim et al. |
| 2007/0127608 A1 | 6/2007 | Scheim et al. |
| 2007/0140330 A1 | 6/2007 | Allpress et al. |
| 2007/0165578 A1* | 7/2007 | Yee et al. ..................... 370/337 |
| 2007/0189404 A1 | 8/2007 | Baum et al. |
| 2007/0213087 A1 | 9/2007 | Laroia et al. |
| 2007/0230593 A1 | 10/2007 | Eliaz et al. |
| 2007/0258517 A1 | 11/2007 | Rollings et al. |
| 2007/0291719 A1 | 12/2007 | Demirhan et al. |
| 2008/0002789 A1 | 1/2008 | Jao et al. |
| 2008/0049598 A1 | 2/2008 | Ma et al. |
| 2008/0080644 A1 | 4/2008 | Batruni |
| 2008/0130716 A1 | 6/2008 | Cho et al. |
| 2008/0130788 A1 | 6/2008 | Copeland |
| 2008/0159377 A1 | 7/2008 | Allpress et al. |
| 2008/0207143 A1 | 8/2008 | Skarby et al. |
| 2008/0260985 A1 | 10/2008 | Shirai et al. |
| 2009/0003425 A1 | 1/2009 | Shen et al. |
| 2009/0028234 A1 | 1/2009 | Zhu |
| 2009/0075590 A1 | 3/2009 | Sahinoglu et al. |
| 2009/0086808 A1 | 4/2009 | Liu et al. |
| 2009/0122854 A1 | 5/2009 | Zhu et al. |
| 2009/0185612 A1 | 7/2009 | McKown |
| 2009/0213908 A1 | 8/2009 | Bottomley |
| 2009/0245226 A1 | 10/2009 | Robinson et al. |
| 2009/0290620 A1 | 11/2009 | Tzannes et al. |
| 2009/0304127 A1* | 12/2009 | Massam et al. ............... 375/343 |
| 2009/0323841 A1 | 12/2009 | Clerckx et al. |
| 2010/0002692 A1 | 1/2010 | Bims |
| 2010/0034253 A1 | 2/2010 | Cohen |
| 2010/0039100 A1 | 2/2010 | Sun et al. |
| 2010/0062705 A1 | 3/2010 | Rajkotia et al. |

(56) References Cited

U.S. PATENT DOCUMENTS

| | | | |
|---|---|---|---|
| 2010/0074349 A1 | 3/2010 | Hyllander et al. | |
| 2010/0115107 A1 | 5/2010 | Yang | |
| 2010/0166050 A1 | 7/2010 | Aue | |
| 2010/0172309 A1 | 7/2010 | Forenza et al. | |
| 2010/0202505 A1 | 8/2010 | Yu et al. | |
| 2010/0202507 A1 | 8/2010 | Allpress et al. | |
| 2010/0208774 A1 | 8/2010 | Guess et al. | |
| 2010/0208832 A1 | 8/2010 | Lee et al. | |
| 2010/0220825 A1* | 9/2010 | Dubuc et al. | 375/346 |
| 2010/0278288 A1 | 11/2010 | Panicker et al. | |
| 2010/0284481 A1 | 11/2010 | Murakami et al. | |
| 2010/0309796 A1 | 12/2010 | Khayrallah | |
| 2010/0329325 A1 | 12/2010 | Mobin et al. | |
| 2011/0051864 A1 | 3/2011 | Chalia et al. | |
| 2011/0064171 A1 | 3/2011 | Huang et al. | |
| 2011/0069791 A1 | 3/2011 | He | |
| 2011/0074500 A1 | 3/2011 | Bouillet et al. | |
| 2011/0074506 A1 | 3/2011 | Kleider et al. | |
| 2011/0075745 A1 | 3/2011 | Kleider et al. | |
| 2011/0090986 A1 | 4/2011 | Kwon et al. | |
| 2011/0134899 A1 | 6/2011 | Jones, IV et al. | |
| 2011/0150064 A1 | 6/2011 | Kim et al. | |
| 2011/0164492 A1 | 7/2011 | Ma et al. | |
| 2011/0170630 A1 | 7/2011 | Silverman et al. | |
| 2011/0182329 A1 | 7/2011 | Wehinger | |
| 2011/0188550 A1 | 8/2011 | Wajcer et al. | |
| 2011/0228869 A1 | 9/2011 | Barsoum et al. | |
| 2011/0243266 A1 | 10/2011 | Roh | |
| 2011/0275338 A1 | 11/2011 | Seshadri et al. | |
| 2011/0310823 A1 | 12/2011 | Nam et al. | |
| 2011/0310978 A1 | 12/2011 | Wu et al. | |
| 2012/0025909 A1 | 2/2012 | Jo et al. | |
| 2012/0027132 A1* | 2/2012 | Rouquette | 375/334 |
| 2012/0051464 A1 | 3/2012 | Kamuf et al. | |
| 2012/0106617 A1 | 5/2012 | Jao et al. | |
| 2012/0163489 A1 | 6/2012 | Ramakrishnan | |
| 2012/0177138 A1 | 7/2012 | Chrabieh et al. | |
| 2012/0207248 A1 | 8/2012 | Ahmed et al. | |
| 2013/0028299 A1 | 1/2013 | Tsai | |
| 2013/0044877 A1 | 2/2013 | Liu et al. | |
| 2013/0077563 A1 | 3/2013 | Kim et al. | |
| 2013/0121257 A1 | 5/2013 | He et al. | |
| 2013/0343480 A1 | 12/2013 | Eliaz | |
| 2013/0343487 A1 | 12/2013 | Eliaz | |
| 2014/0036986 A1 | 2/2014 | Eliaz | |
| 2014/0056387 A1 | 2/2014 | Asahina | |
| 2014/0098841 A2 | 4/2014 | Song et al. | |
| 2014/0098907 A1 | 4/2014 | Eliaz | |
| 2014/0098915 A1 | 4/2014 | Eliaz | |
| 2014/0105267 A1 | 4/2014 | Eliaz | |
| 2014/0105268 A1 | 4/2014 | Eliaz | |
| 2014/0105332 A1 | 4/2014 | Eliaz | |
| 2014/0105334 A1 | 4/2014 | Eliaz | |
| 2014/0108892 A1 | 4/2014 | Eliaz | |
| 2014/0133540 A1 | 5/2014 | Eliaz | |
| 2014/0140388 A1 | 5/2014 | Eliaz | |
| 2014/0140446 A1 | 5/2014 | Eliaz | |
| 2014/0146911 A1 | 5/2014 | Eliaz | |
| 2014/0161158 A1 | 6/2014 | Eliaz | |
| 2014/0161170 A1 | 6/2014 | Eliaz | |
| 2014/0198255 A1 | 7/2014 | Kegasawa | |

OTHER PUBLICATIONS

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog •Iu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686, Nov. 1989.

S. Mita, M. M Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Miao, George J., Signal Processing for Digital Communications, 2006, Artech House, pp. 375-377.

Xiong, Fuqin. Digital Modulation Techniques, Artech House, 2006, Chapter 9, pp. 447-483.

Faulkner, Michael, "Low-Complex ICI Cancellation for Improving Doppler Performance in OFDM Systems", Center for Telecommunication and Microelectronics, 1-4244-0063-5/06/$2000 (c) 2006 IEEE. (5 pgs).

Stefano Tomasin, et al. "Iterative Interference Cancellation and Channel Estimation for Mobile OFDM", IEEE Transactions on Wireless Communications, vol. 4, No. 1, Jan. 2005, pp. 238-245.

Int'l Search Report and Written Opinion for PCT/IB2013/01866 dated Mar. 21, 2014.

Int'l Search Report and Written Opinion for PCT/IB2013/001923 dated Mar. 21, 2014.

Int'l Search Report and Written Opinion for PCT/IB2013/001878 dated Mar. 21, 2014.

Int'l Search Report and Written Opinion for PCT/IB2013/002383 dated Mar. 21, 2014.

Int'l Search Report and Written Opinion for PCT/IB2013/01860 dated Mar. 21, 2014.

Int'l Search Report and Written Opinion for PCT/IB2013/01970 dated Mar. 27, 2014.

Int'l Search Report and Written Opinion for PCT/IB2013/01930 dated May 15, 2014.

(56) References Cited

OTHER PUBLICATIONS

Int'l Search Report and Written Opinion for PCT/IB2013/02081 dated May 22, 2014.

Al-Dhahir, Naofal et al., "MMSE Decision-Feedback Equalizers: Finite-Length Results" IEEE Transactions on Information Theory, vol. 41, No. 4, Jul. 1995.

Cioffi, John M. et al., "MMSE Decision-Feedback Equalizers and Coding—Park I: Equalization Results" IEEE Transactions onCommunications, vol. 43, No. 10, Oct. 1995.

Eyuboglu, M. Vedat et al., "Reduced-State Sequence Estimation with Set Partitioning and Decision Feedback" IEEE Transactions onCommunications, vol. 36, No. 1, Jan. 1988.

* cited by examiner

DYNAMIC CONFIGURATION OF MODULATION AND DEMODULATION

INCORPORATION BY REFERENCE

The entirety of each of the following applications is hereby incorporated herein by reference:

U.S. Pat. No. 8,582,637 titled "Low-Complexity, Highly-Spectrally-Efficient Communications;"

U.S. Pat. No. 8,553,821 titled "Adaptive Non-Linear Model for Highly-Spectrally-Efficient Communications;"

U.S. Pat. No. 8,842,778 titled "Multi-Mode Receiver for Highly-Spectrally-Efficient Communications;" and U.S. Pat. No. 8,744,003 titled "Multi-Mode Receiver for Highly-Spectrally-Efficient Communications."

BACKGROUND

Limitations and disadvantages of conventional modulators and demodulators, and methods of operating them, will become apparent to one of skill in the art, through comparison of such approaches with some aspects of the present method and system set forth in the remainder of this disclosure with reference to the drawings.

BRIEF SUMMARY

Methods and systems are provided for multimode modulation and demodulation, substantially as illustrated by and/or described in connection with at least one of the figures, as set forth more completely in the claims.

DETAILED DESCRIPTION

Figure 1:
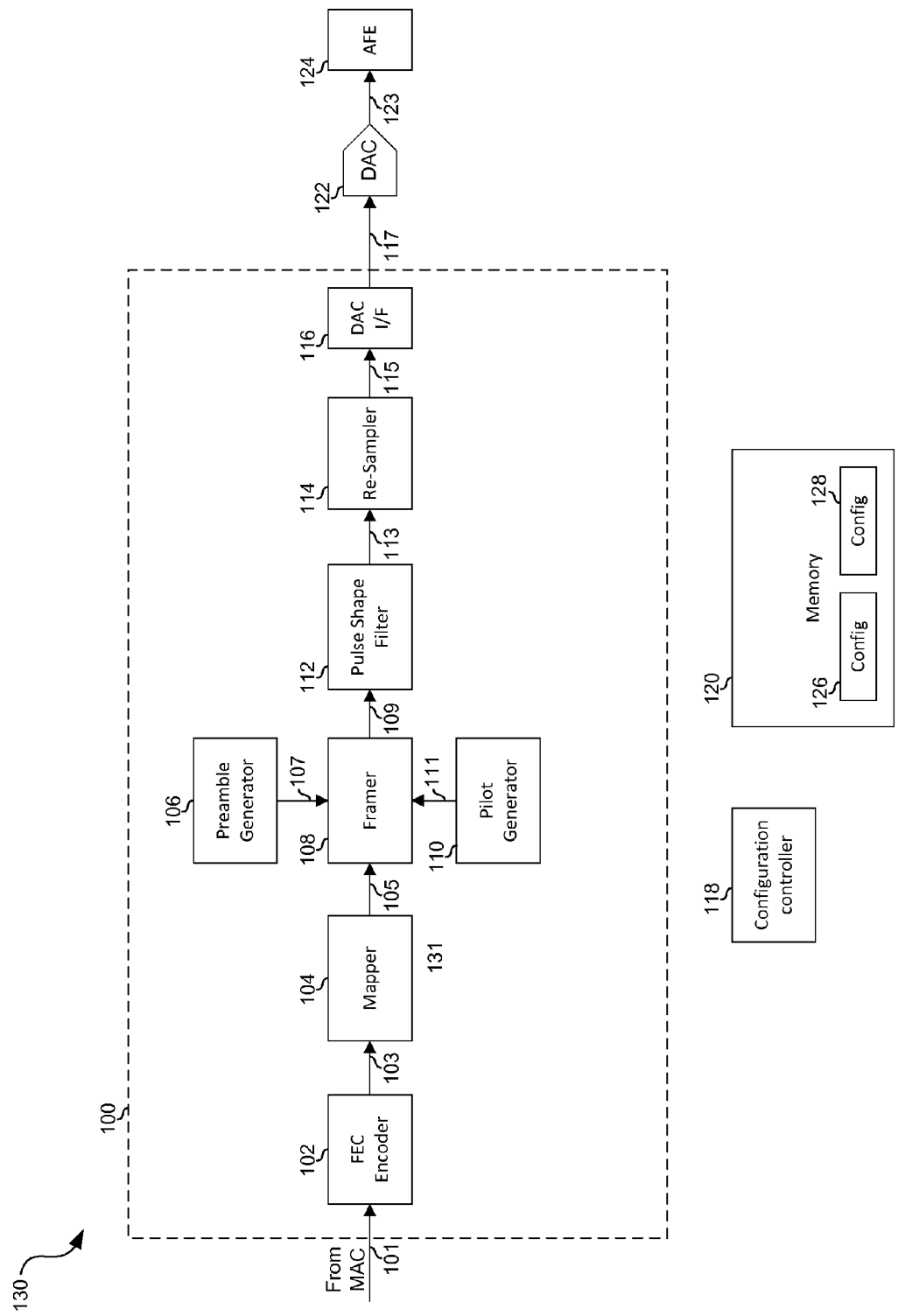
FIG. 1 is a simplified block diagram of a modulator in accordance with aspects of this disclosure.

Aspects of this patent disclosure provide for switching between modulator/demodulator configurations without introducing errors as a result of the change in configuration. Different configurations may, for example, correspond to different symbol rates. Different configurations may, for example, correspond to different amounts of controlled inter-symbol interference (ISI) introduced to the transmitted signal. For example, a first configuration may use be a near-zero ISI configuration (e.g., using Nyquist signaling) and a second configuration may introduce a significant (e.g., amount that would result in errors above a desired threshold if demodulation relied on symbol-by-symbol slicing) but controlled amount of ISI (e.g., using partial response or faster than Nyquist signaling). As used herein, the term "inter-symbol correlated (ISC) signal" will refer to a signal having a significant but controlled amount of ISI. Partial response signals and faster-than-Nyquist-rate signals are thus two examples of ISC signals. Similarly, a Nyquist rate signal to which a controlled nonlinear distortion has been introduced resulting in significant ISI is another example of an ISC signal.

Switching between modulator/demodulator configurations may be needed to maintain a stable link in the case of dynamic channels. At any given time, a modulator and demodulator pair may, for example, switch to a configuration that provides maximal throughput for the current channel conditions. Such conditions may include, for example, signal-to-noise ratio (SNR), fading, co-channel interference, adjacent channel interference, nonlinear distortion, and/or the like. In some applications, to prevent the reconfiguration from introducing errors the change in configurations may be synchronized between modulator and demodulator.

Partial response or faster-than-Nyquist based modulation (e.g., as described in the above-incorporated U.S. patents) may use higher symbol rate than Nyquist based modulation for a given throughput. In this case, the symbol of the partial response modulation carries less information bits comparing to the Nyquist-based modulation. Furthermore, different partial response or faster-than-Nyquist configurations of the modulator/demodulator may use different combinations of symbol rate and spectral efficiency to provide a desired threshold SNR to accommodate channel conditions.

Aspects of this disclosure provide for synchronizing a modulator and demodulator such that timing discontinuity can be avoided when switching between a Nyquist-based configuration and a faster-than-Nyquist configuration or between faster-than-Nyquist configurations of different spectral densities.

In an example embodiment, a high-level link management protocol may be executed by circuitry of the modulator and demodulator. Either in-band and/or out-of-band maintenance communication channel(s) may be used to carry messages of the protocol. A change in configuration may be triggered based on an indication of demodulation performance generated by the demodulator. The indication of demodulation performance may comprise, for example, received signal strength of the desired signal, mean square error (MSE), received signals strength of undesired signals (interference), bit error rate (BER), symbol error rate (SER), amount of nonlinear distortion (e.g., an error vector magnitude measurement), amount of phase noise, and/or the like. Once circuitry tasked with managing the link (e.g., the CPU of the modulator, the CPU of the demodulator, or some other link manager). Once a decision is made to switch modulator/demodulator configurations, control traffic carrying information about the new configuration is transmitted over the maintenance channel to the remote to configuration control circuitry of the modulator (where the decision is made by the demodulator), to configuration control circuitry of the demodulator (where the decision is made by the modulator), or to both configuration control circuitry of the modulator and configuration control circuitry of the demodulator (where the decision is managed by a third-party link manager). The link management circuitry of the modulator writes parameters for the new configuration into a set of shadow registers in the modulator and the link management circuitry of the demodulator writes parameters for the new configuration into shadow registers in the demodulator. The configuration parameters may include, for example, different symbol mapping (e.g., different symbol mappings may correspond to different symbol constellations having different number of bits per symbol), interpolation ratio for a desired symbol rate, taps coefficients of a pulse shaping filter of the modulator, symbol pilot rate, FEC code rate, number of FEC frames per preamble, number of stuffing bits needed to complete frames, and/or the like. The circuitry of both the modulator and demodulator may switch between the actual and shadow registers at a time instant synchronized with the advance of the first frame of the new configuration through the modulator and demodulator pipelines, as explained below.

FIG. 1 is a simplified block diagram of a modulator in accordance with aspects of this disclosure. Shown is a transmitter 130 that comprises a modulator 100, digital-to-analog converter (DAC) 112, an analog front-end (AFE) 124, a configuration controller 118 and memory 120. The example modulator 100 comprises an encoder circuit 102, a symbol mapper circuit 104, a preamble generator circuit 106, a framer circuit 108, a pilot generator circuit 110, a pulse shaping filter circuit 112, a resampling circuit 114, and an interface circuit 116 for interfacing to the DAC 122.

The encoder circuit 102 comprises circuitry operable to perform forward error correction coding on this signal 101 to generate the signal 103. The encoder circuit 102 may support a plurality of FEC algorithms (e.g., low-density parity check, Reed-Solomon, turbo coding, etc.) and/or a plurality of FEC code rates. The FEC algorithm and/or code rate used by the encoder circuit 102 may vary with different configurations of the modulator 100, as controlled by configuration controller 118.

The symbol mapper circuit 104 comprises circuitry operable to map groups of one or more bits to symbols using a determined symbol constellation. The symbol constellation used by symbol mapper circuit 104 may vary with different configurations of the modulator 100, as controlled by configuration controller 118.

The preamble generator circuit 106 comprises circuitry operable to generate preamble sequences. The preamble generator circuit 106 may generate preambles sequences comprising any number and/or type of symbols, where different preamble sequences may be used for different configurations of the modulator 100, as controlled by configuration controller 118. Furthermore, as discussed below, different preamble sequences may be used for signaling transitions between configurations of the modulator 100.

The pilot generator circuit 110 comprises circuitry operable to generate pilot symbols. The phase, amplitude, frequency, and/or any other characteristics of the generated pilots symbols may vary with different configurations of the modulator 100, as controlled by configuration controller 118.

The framer circuit 108 comprises circuitry operable to generate frames by combining symbols from mapper 104, preambles from preamble generator 106, and pilots from pilot generator 110. The number and/or type of preambles sequences and/or pilot symbols added to any particular frame may vary with different configurations of the framer circuit 108, as controlled by configuration controller 118.

The pulse shaping filter circuit 112 comprises circuitry operable to filter the signal 109 such that it adheres to an applicable spectral mask specified by a regulatory authority (e.g., the FCC in the U.S.) or standards body (e.g., IEEE). The pulse shaping filter 112 may be similar to, or the same as, the pulse shaping filters described in the above-incorporated patents. The pulse shaping filter 112 may support a plurality of configurations for Nyquist rate signaling communications and a plurality of configurations for faster-than-Nyquist signaling. Number and/or value of tap coefficients of the pulse shaping filter 112 may vary with different configurations of the modulator 100. The configuration controller 118 may control which of the configurations that the pulse shaping filter 112 is in at any given time.

The resampling circuit 114 comprises circuitry operable to sample the symbols 113 output by pulse shaping filter 112 into samples of signal 115 output at the DAC clock rate, which may be higher than the symbol rate. In an example embodiment, the re-sampler 114 uses a numerically controlled oscillator and polyphase filter for achieving non-integer interpolation ratios.

The interface circuit 116 comprises circuitry operable to pre-condition the signal 115 to correct for non-idealities of the subsequent circuitry of the transmitter 130. For example, the interface circuit 116 may compensate for the response (zero order hold) of the DAC 122. As another example, the interface circuit 116 may compensate for I-Q mismatch introduced in the RF front-end 124.

The configuration controller 118 comprises circuitry operable to implement a link management protocol such as is described above. In this regard, the configuration controller 118 may make or receive (e.g., from a remote demodulator or third-party link management entity) decisions about a configuration in which the modulator 100 should be, and may perform actions (e.g., write configuration parameters to a shadow register in memory 120, generate link management messages to be transmitted via the maintenance channel(s), etc.) to effect reconfiguration of the modulator 100 (and, in some embodiments, trigger reconfiguration of a demodulator to which the modulator 100 transmits).

The memory 120 may comprise SRAM, DRAM, flash, magnetic storage, and/or other suitable type of memory serving as program memory, data memory, configuration registers, and long-term storage. In an example embodiment, the memory 120 comprises two configuration registers 126 and 128. At any given time, one of the registers 126 and 128 stores the parameters for the current configuration of the modulator 100 and the other of the registers 126 and 128 operates as a shadow register that can be loaded with new configuration parameters. Then, at a time instant determined by the configuration controller 118, the roles of the registers 126 and 128 are switched to effect the reconfiguration of the modulator 100. In this manner, there is no down time caused by the finite amount of time it takes to modify register contents.

In operation, packets received from a media access controller (MAC) of transmitter 130 are divided into fixed length frames. The optional encoder circuit 102 adds forward error correction bits to each frame. The mapper 104 then converts the frames of bits into frames of symbols. The framer 108 then appends a preamble sequence from preamble generator 106 to the beginning of each frame, and also inserts pilot symbols from pilot generator 110 at known places inside the frame. In an example embodiment, the preamble sequence is designed to have desired auto correlation characteristics. The symbols out of the framer 108 are filtered by the pulse shape filter 112 to generate samples of the signal 113. The re-sampler 114 interpolates the samples of signal 113 to generate signal 115. The DAC interface 116 which pre-conditions the signal 115 for processing by the digital-to-analog converter 122.

In an example embodiment, configuration switching is synchronized by marking the start and end of last frame of the old configuration. Three flags: SOF (Start of Frame), EOF (End of Frame) and LFR (last frame of current configuration) are used in an example embodiment, where LFR is active throughout the last frame from SOF to EOF. The flags accompany (e.g., as metadata appended to the signal data) the frames down the modulator pipeline from its input at the encoder 102 (or mapper 104, if encoder 102 is not present) to the re-sampler 114. In such an embodiment, configuration switching is initiated by the configuration controller 118 writing parameters of the new configuration to a register 126 or 128. Then, the next incoming frame after the write of the configuration parameters to register 126 or 128 is marked LFR (e.g., by encoder 102 or, where the encoder 102 is not present, by mapper 104). Switching of configuration registers at each stage (i.e., circuit) of the modulator is synchronized with the EOF of a frame flagged as LFR, such that the first symbol of the new frame is processed with the new configuration. Switching of interpolation ratio at the re-sampler 114 is performed after the last sample of the last symbol of LFR was generated.

To avoid errors and/or latency at the demodulator, the modulator 100 may generate signaling that alerts a demodulator as to the last frame to process using an old configuration before switching to a new configuration. In an example embodiment, such signaling may comprise: when SOF of a frame marked LFR arrives at the framer 108, the preamble generator 106 generates a negated preamble sequence. That is, each symbol is negated relative to the normal preamble symbol that is used for frames that are not marked LFR. In another embodiment, rather than simply negating the preamble sequence, an entirely different preamble sequence may be used for frames marked LFR. A drawback of this latter approach is that it adds complexity at the de-modulator. An advantage of the latter approach is that it may be more robust to harsh link conditions.

Figure 2:
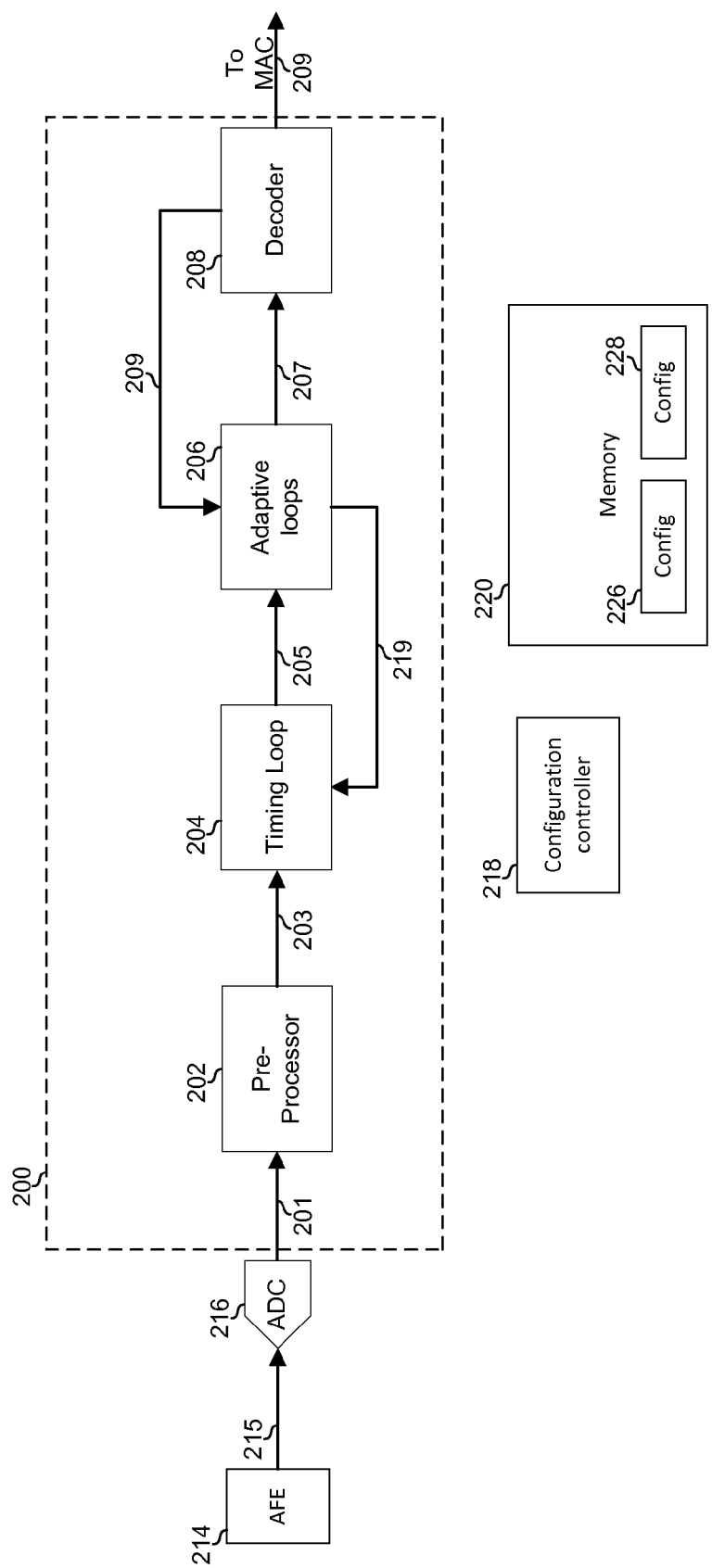
FIG. 2 is a simplified block diagram of a demodulator in accordance with aspects of this disclosure.

FIG. 2 is a simplified block diagram of a demodulator in accordance with aspects of this disclosure. Shown is a receiver 230 that comprises a demodulator 200, an analog front end circuit 214, an analog-to-digital converter circuit 216, a configuration controller circuit 218, and memory 220. The example demodulator 200 comprises a pre-processor circuit 202, a timing loop circuit 204, adaptive loops circuit 206, and a decoder 208.

The pre-processor circuit 202 comprises circuitry operable to pre-condition samples from the ADC 216. In an example embodiment, the pre-processor circuit 202 performs "blind" adaptation that does not depend on the modulator/demodulator configuration. Such adaptations may include, for example, DC removal, automatic gain control, and I-Q mismatch correction.

The timing loop circuit 204 comprises circuitry operable to convert the samples of signal 203 into symbols of signal 205, regenerating the modulator symbol clock. The timing loop circuit 204 also comprises circuitry operable to generate frame synchronization flags SOF, LFR, and EOF (similar to as performed by modulator 100, as described above). Additional details of the timing loop 204 and how it synchronizes the configuration switching are described below with reference to FIG. 3.

The adaptive loops circuit 206 comprises circuitry operable to condition the symbols based on error signal 209 from the decoder 208. Adaptive functions performed by the adaptive loops circuit 206 may comprise, for example: feed forward equalization, carrier recovery, and, where feed forward equalization is performed based on MMSE cost function, correction of bias introduced by the feed forward equalization. In the example embodiment shown, a carrier recovery function of the adaptive loops circuit 206 is operable to determine a difference in frequency between a local oscillator of the modulator 100 which generated the received signal and a local oscillator of the demodulator 200 and outputs the frequency difference as signal 219.

The decoder 208 comprises circuitry operable to translate symbols of the signal 207 into bits of the signal 209. The decoder 208 may support a plurality of FEC algorithms (e.g., low-density parity check, Reed-Solomon, turbo coding, etc.) and/or a plurality of FEC code rates. The FEC algorithm and/or code rate used by the decoder circuit 208 may vary with different configurations of the demodulator 200, as controlled by configuration controller 218. The circuitry of the decoder 208 is also operable to generate the error signal 209 which is used for adaptation of the adaptive loops circuit 206.

The configuration controller circuit 218 comprises circuitry operable to implement a link management protocol such as is described above. In this regard, the configuration controller 218 may make or receive (e.g., from a remote modulator or third-party link management entity) decisions about a configuration in which the demodulator 200 should be, and may perform actions (e.g., write configuration parameters to a shadow register in memory 212, generate link management messages to be transmitted via the maintenance channel(s), etc.) to effect reconfiguration of the demodulator 200 (and, in some embodiments, trigger reconfiguration of a modulator from which the demodulator 200 receives transmissions). In an example embodiment, the configuration controller 218 is operable to measure or calculate one or more indications of demodulation performance based on inputs and/or outputs of the other circuits of the receiver 230.

The memory 220 may comprise SRAM, DRAM, flash, magnetic storage, and/or other suitable type of memory serving as program memory, data memory, configuration registers, and long-term storage. In an example embodiment, the memory 220 comprises two configuration registers 226 and 228. At any given time, one of the registers 226 and 228 stores the parameters for the current configuration of the demodulator 200 and the other of the registers 226 and 228 operates as a shadow register that can be loaded with new configuration parameters. Then, at a time instant determined by the configuration controller 218, the roles of the registers 226 and 228 are switched to effect the reconfiguration of the demodulator 200. In this manner, there is no down time caused by the finite amount of time it takes to modify register contents.

In operation, a signal is received from a channel by AFE 214, the analog signal 215 output by the AFE 214 is digitized by ADC 216 resulting in signal 201. Signal 201 is processed by pre-processor 202 to generate signal 203 which is processed by timing loop 204 to generate signal 205. Signal 205 is processed by adaptive loops circuit 206, based on error signal 209, to generate signal 207. Symbols of signal 207 are then decoded to bits of signal 209.

Figure 3:
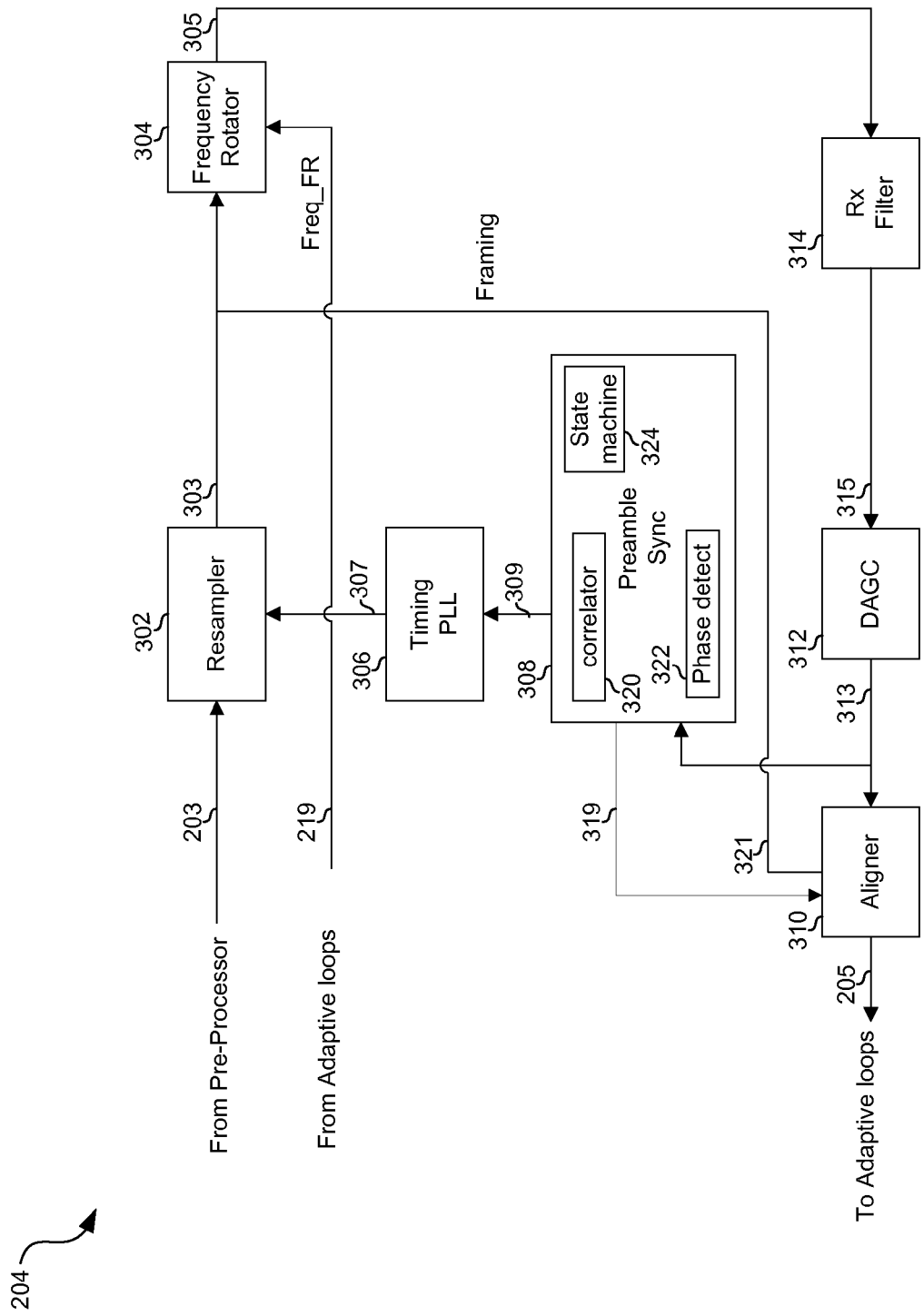
FIG. 3 depicts additional details of an example embodiment of the demodulator of FIG. 2.

FIG. 3 depicts additional details of an example embodiment of the demodulator of FIG. 2. The example timing loop circuit 204 shown in FIG. 3 comprises a re-sampler circuit 302, a frequency rotator 304, a timing phase-locked loop (PLL) 306, a preamble synchronization circuit 308, an aligner circuit 310, a digital automatic gain correction (DAGC) circuit 312, and a receive filter circuit 314.

The re-sampler circuit 302 comprises circuitry operable to convert input samples of signal 203 into symbols of signal 303. In an example embodiment, the re-sampler circuit 302 performs non-integer decimation of the samples using an NCO and PolyPhase filter—like the re-sampler 114 of the modulator 100. The output signal 303 carries symbols at (ideally) the same rate and phase as signal 113 of the modulator 100 that generated the received signal.

The frequency rotator 304 comprises circuitry operable to rotate the complex-valued symbols of signal 303 such that it compensates for difference in frequency between the local oscillators of the modulator 100 that generated the received signal and the demodulator 200. The frequency rotator 304 receives the frequency difference as signal 219 from the adaptive loops circuit 206. The signal 305 output by the frequency rotator 304 carries symbols at (ideally) a constant phase, except for phase jitter.

The timing phase-locked loop (PLL) 306 comprises circuity operable to correct the timing drift between the symbol clocks of the demodulator 200 and the modulator 100 that generated the received signal. In an example embodiment, the correction comprises modifying the increment step of a numerically controlled oscillator (NCO) of the re-sampler 302 step such that the re-sampler 302 outputs a determined number of symbols between consecutive preamble sequences. Each of the filter circuit 314, the DAGC 312, and the preamble synchronization circuit 308 inserts a delay of a known number of symbols such that the total delay of the timing loop is a known number of symbols. In an example embodiment, the known delay introduced by each of circuits 314, 312, and 308 may be fixed such that the total delay of the timing loop is fixed.

The preamble synchronization circuit 308 comprises, for example, a correlator 320 operable to detect preamble sequences in the signal 313 and a state machine 324 that synchronizes to a series of preambles at programmable distance (i.e., programmable number of symbols between consecutive preamble sequences). In an example embodiment, the preamble synchronization circuit 308 comprises a phase detector 322 at the output of the correlator 320. The phase detector 322 may be activated by configuration controller 210 when a configuration switch is expected. When active, the phase detector 322 may be operable to detect a preamble sequence that indicates LFR (e.g., detects a negated preamble sequence) and indicate such preamble detection by asserting signal 319 (e.g., asserts signal 319 at the end of the preamble sequence).

The aligner circuit 310 comprises circuitry operable to generate framing synchronization flags (SOF. EOF, LFR) such that downstream circuits (e.g., adaptive loops circuit 206 and decoder circuit 208) can switch configurations at the appropriate time (i.e., after EOF of a frame flagged as LFR). In an example embodiment, since the length of the preamble sequence, the gap between frames, and all the delays of the timing loop 204 are known, the aligner circuit generates the EOF and SOF flags referred to the output of the re-sampler 302 by counting symbols from a preamble detection indication on signal 219.

The digital automatic gain correction (DAGC) circuit 312 comprises circuitry operable to adjust the level of signal 315 output by filter 314.

The receive filter circuit 314 comprises, for example, a low pass filter operable to attenuate the out-of-band components. For a faster-than-Nyquist signaling configuration of the demodulator 200, the filter 314 may, for example, have a response other than square root raised cosine. For a Nyquist-rate signaling configuration of the demodulator 200, the filter 314 may, for example, have a square root raised cosine response.

In an example embodiment, the re-sampler circuit 302 changes its decimation factor after the last sample of a frame marked as LFR. This ensures that the configuration switch is synchronized with a corresponding configuration switch in the modulator that generated the received signal. The LFR indication on signal 319 from the preamble synchronization circuit 308 may lag behind the frame sync signals of the received signal. Accordingly, the aligner circuit 310 may delay the samples to downstream circuits (e.g., adaptive loops circuit 206 and decoder 208) such that its LFR output is properly aligned with EOF and SOF. This makes it possible for the decoder 208 to change the LFR-indicating preamble sequence to a normal preamble sequence.

In accordance with an example embodiment of this disclosure, a transmitter (e.g., 130) may comprise a modulator circuit (e.g., 100) configurable into at least two configurations, wherein at least one of the configurations is an inter-symbol correlated signaling (e.g., partial response signaling or faster-than-Nyquist-rate signaling) configuration. Which of the configurations the modulator operates in at a particular time is determined based on an indication of performance. At least one other of the configurations may be a Nyquist-rate signaling configuration. The modulator may comprise circuitry (e.g., encoder 102, mapper 104, preamble generator 106, framer 108, pilot generator 110, pulse shaping filter 112, and re-sampler 114) that is operable to, upon a decision to switch from a first one of the configurations to a second one of the configurations, mark (e.g., set a flag bit) a last frame generated with the first configuration. The modulator may comprise a framing circuit (e.g., 108) that is operable to detect start of frame indicators in frames that it processes, and detect whether frames that it processes are marked as a last frame of a current one of the configurations. The framing circuity may be operable to, upon detecting a start of frame indicator of a frame marked as a last frame of a current one of the configurations, add a last-frame-indicating preamble to the last frame. The last-frame-indicating preamble may be a negated version of a preamble used for other frames (i.e., frames that are not the last frames generated before modulator reconfiguration). The indication of performance may be an indication of demodulation performance received from a receiver to which the transmitter transmits. The indication of demodulation performance may be one or more of: received signal strength, mean square error, bit error rate, symbol error rate, amount of interference, signal-to-noise ratio, amount of non-linear distortion, amount of phase noise. The modulator may comprise circuitry (e.g., encoder 102 or mapper 104) that, in response to a decision to switch from a first of the configurations to a second of the configurations, is operable to generate a start of frame flag synchronized to the start of a last frame generated with the first of the configurations, generate an end of frame flag synchronized to the end of the last frame generated with the first of the configurations, and generate a last frame flag synchronized with the start of frame flag and the end of frame flag. The start of frame flag, the end of frame flag, and the last frame flag may propagate through a plurality of circuits of the modulator (e.g., encoder 102, mapper 104, preamble generator 106, framer 108, pilot generator 110, pulse shaping filter 112, and re-sampler 114) along with the last frame. For the reconfiguration of the modulator from the first configuration to the second configuration, reconfiguration of each of the plurality of the circuits of the modulator may be synchronized with one or more of the start of frame flag, the end of frame flag, and the last frame flag. Reconfiguration of the modulator among different ones of the configurations may comprise reconfiguration of taps coefficients of a pulse shaping filter of the modulator.

In accordance with an example embodiment of this disclosure, a receiver (e.g., 230) comprises a demodulator circuit (e.g., 200), wherein in a first configuration, the demodulator circuit is configured to demodulate faster-than-Nyquist-rate signals, and in a second configuration, the demodulator circuit is configured to demodulate Nyquist-rate signals. The demodulator circuit may be operable to dynamically (i.e., in real-time) switch between the first configuration and the second configuration. The demodulator circuit may be operable to measure demodulation performance for a received signal, and trigger a reconfiguration of the demodulator circuit between the first configuration and the second configuration in response to the measured demodulation performance. The demodulator circuit may be operable to trigger a reconfiguration of a modulator (e.g., 100) that generated the received signal in response to the measured demodulation performance. The measured demodulation performance may be characterized by one or more of the following: received signal strength, mean square error, bit error rate, symbol error rate, amount of interference, signal-to-noise ratio, amount of non-linear distortion, amount of phase noise. The demodulator circuit may be operable to trigger a reconfiguration of the demodulator between the first configuration and the second configuration in response to an indication that a modulator from which it receives signal has been reconfigured. The indication that a modulator has been reconfigured may comprise a last-frame-indicating preamble. The last-frame-indicating preamble may be a negated version of a normal preamble. The receiver may comprise a preamble phase detector (e.g., 322) operable to determine a phase of a received preamble. The receiver may comprise a configuration controller (e.g., 218) that is operable to disable the preamble phase detector when a reconfiguration of the demodulator is not expected to occur within a determined amount of time, and enable the preamble phase detector in response to a determination that a reconfiguration of the of said demodulator is to occur within a determined amount of time.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical embodiment may comprise an application specific integrated circuit or chip. Some embodiments may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain embodiments, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular embodiments disclosed, but that the present method and/or system will include all embodiments falling within the scope of the appended claims.

What is claimed is:

1. A transmitter comprising:
   a modulator circuit configurable into at least two configurations, wherein:
      at least one of said configurations is an inter-symbol correlated signaling configuration;
      which of said configurations said modulator operates in at a particular time is determined based on an indication of demodulation performance; and
      said modulator comprises a framing circuit that is operable to:
         detect start of frame indicators in frames processed by said framing circuit;
         detect that a particular frame is marked as a last frame of a current one of said configurations; and
         upon detection of one of said start of frame indicators in said particular frame marked as said last frame of said current one of said configurations, add a last-frame-indicating preamble to said particular frame.

2. The transmitter of claim 1, wherein at least one of said configurations is a Nyquist-rate signaling configuration.

3. The transmitter of claim 1, wherein said modulator comprises circuitry that is operable to, upon a decision to switch from a first one of said configurations to a second one of said configurations, mark a last frame generated with said first configuration.

4. The transmitter of claim 1, wherein said last-frame-indicating preamble is a negated version of a preamble used for other frames.

5. The transmitter of claim 1, wherein the indication of demodulation performance is one or more of: received signal strength, mean square error, bit error rate, symbol error rate, amount of interference, signal-to-noise ratio, amount of non-linear distortion, amount of phase noise.

6. The transmitter of claim 1, wherein said modulator comprises circuitry that, in response to a decision to switch from a first of said configurations to a second of said configurations, is operable to:
   generate a start of frame flag synchronized to the start of a last frame generated with said first of said configurations;
   generate an end of frame flag synchronized to the end of said last frame generated with said first of said configurations; and
   generate a last frame flag synchronized with said start of frame flag and said end of frame flag.

7. The transmitter of claim 6, wherein said start of frame flag, said end of frame flag, and said last frame flag propagate through a plurality of circuits of said modulator along with said last frame.

8. The transmitter of claim 7, wherein, for said reconfiguration of said modulator from said first configuration to said second configuration, reconfiguration of each of said plurality of said circuits of said modulator is synchronized with one or more of said start of frame flag, said end of frame flag, and said last frame flag.

9. The transmitter of claim 1, wherein reconfiguration of said modulator among different ones of said configurations comprises reconfiguration of taps coefficients of a pulse shaping filter of said modulator.

10. The transmitter of claim 1, wherein said inter-symbol correlated signaling configuration is a partial response signaling configuration.

11. The transmitter of claim 1, wherein said inter-symbol correlated signaling configuration is faster-than-Nyquist-rate signaling configuration.

12. A receiver comprising:
a demodulator circuit comprising a preamble phase detector operable to determine a phase of a received preamble, wherein
in a first configuration, said demodulator circuit is configured to demodulate faster-than-Nyquist-rate signals;
in a second configuration, said demodulator circuit is configured to demodulate either Nyquist-rate signals or faster-than-Nyquist-rate signals;
said demodulator circuit is operable to dynamically switch between said first configuration and said second configuration; and
said demodulator circuit is operable to trigger a reconfiguration of said demodulator between said first configuration and said second configuration in response to an indication that a modulator has been reconfigured.

13. The receiver of claim 12, wherein said demodulator circuit is operable to:
measure demodulation performance for a received signal; and
trigger said reconfiguration of said demodulator circuit between said first configuration and said second configuration in response to said measured demodulation performance.

14. The receiver of claim 13, wherein said demodulator circuit is operable to trigger said reconfiguration of said modulator that generated said received signal in response to said measured demodulation performance.

15. The receiver of claim 14, wherein said measured demodulation performance is characterized by one or more of the following: received signal strength, mean square error, bit error rate, symbol error rate, amount of interference, signal-to-noise ratio, amount of nonlinear distortion, amount of phase noise.

16. The receiver of claim 12, wherein said indication that said modulator has been reconfigured comprises a last-frame-indicating preamble.

17. The receiver of claim 16, wherein said last-frame-indicating preamble is a negated version of a normal preamble.

18. The receiver of claim 12, comprising a configuration controller that is operable to:
disable said preamble phase detector when said reconfiguration of said demodulator is not expected to occur within a determined amount of time; and
enable said preamble phase detector in response to a determination that said reconfiguration of said demodulator is to occur within said determined amount of time.

19. A transmitter comprising:
a modulator circuit configurable into at least two configurations, wherein:
at least one of said configurations is an inter-symbol correlated signaling configuration;
which of said configurations said modulator operates in at a particular time is determined based on an indication of demodulation performance; and
said modulator comprises circuitry that, in response to a decision to switch from a first of said configurations to a second of said configurations, is operable to:
generate a start of frame flag synchronized to the start of a last frame generated with said first of said configurations;
generate an end of frame flag synchronized to the end of said last frame generated with said first of said configurations; and
generate a last frame flag synchronized with said start of frame flag and said end of frame flag.

20. The transmitter of claim 19, wherein at least one of said configurations is a Nyquist-rate signaling configuration.

21. The transmitter of claim 19, wherein said modulator comprises circuitry that is operable to, upon a decision to switch from a first one of said configurations to a second one of said configurations, mark a last frame generated with said first configuration.

22. The transmitter of claim 19, wherein:
said modulator comprises a framing circuit that is operable to:
detect start of frame indicators in frames processed by said framing circuit;
detect that a particular frame is marked as a last frame of a current one of said configurations;
upon detection of one of said start of frame indicators in said particular frame marked as said last frame of said current one of said configurations, add a last-frame-indicating preamble to said particular frame; and
said last-frame-indicating preamble is a negated version of a preamble used for other frames.

23. The transmitter of claim 19, wherein the indication of demodulation performance is one or more of: received signal strength, mean square error, bit error rate, symbol error rate, amount of interference, signal-to-noise ratio, amount of nonlinear distortion, amount of phase noise.

24. The transmitter of claim 19, wherein said start of frame flag, said end of frame flag, and said last frame flag propagate through a plurality of circuits of said modulator along with said last frame.

25. The transmitter of claim 24, wherein, for said reconfiguration of said modulator from said first configuration to said second configuration, reconfiguration of each of said plurality of said circuits of said modulator is synchronized with one or more of said start of frame flag, said end of frame flag, and said last frame flag.

26. The transmitter of claim 19, wherein reconfiguration of said modulator among different ones of said configurations comprises reconfiguration of taps coefficients of a pulse shaping filter of said modulator.

27. The transmitter of claim 19, wherein said inter-symbol correlated signaling configuration is a partial response signaling configuration.

28. The transmitter of claim 19, wherein said inter-symbol correlated signaling configuration is faster-than-Nyquist-rate signaling configuration.

* * * * *